Sept. 26, 1950 J. C. HOBBS Re. 23,272

VALVE CONSTRUCTION

Original Filed Feb. 23, 1940 3 Sheets-Sheet 1

INVENTOR.
JAMES CLARENCE HOBBS

BY Richey & Watts
ATTORNEYS

Sept. 26, 1950 J. C. HOBBS Re. 23,272

VALVE CONSTRUCTION

Original Filed Feb. 23, 1940 3 Sheets-Sheet 2

INVENTOR.
JAMES CLARENCE HOBBS

BY Richey & Watts
ATTORNEYS.

VALVE CONSTRUCTION

Original Filed Feb. 23, 1940 3 Sheets-Sheet 3

INVENTOR.
JAMES CLARENCE HOBBS
BY Richy & Watts
ATTORNEYS

Reissued Sept. 26, 1950

Re. 23,272

UNITED STATES PATENT OFFICE 23,272

VALVE CONSTRUCTION

James Clarence Hobbs, Coral Gables, Fla.

Original No. 2,321,597, dated June 15, 1943, Serial No. 320,476, February 23, 1940. Application for reissue April 29, 1950, Serial No. 159,117

23 Claims. (Cl. 251—50)

Matter enclosed in heavy brackets [ ] appears in the original patent but forms no part of this reissue specification; matter printed in italics indicates the additions made by reissue

This invention relates to fluid valves and more particularly to valves for use with fluids under high pressure, for example, high temperature high pressure steam or medium temperature water under high pressure. Altho the present invention is particularly adapted for fluid pressures on the order of 2500 pounds per square inch, it is also suitable for pressures down to 1000 pounds per square inch or lower.

Prior to the present invention the valves which were available for high pressure fluids were generally similar in design to the valves previously used for much lower pressures, the main differences being that the parts of the older valves were greatly enlarged to make them strong enough to withstand the higher pressures. In other words, the design of the high pressure valves available on the market now is more or less orthodox and involves no fundamental differences over the long used low pressure valves and include no particular means, except heavier metal parts, for meeting the needs peculiar to control of fluids under high pressures.

The present day high pressure valves possess a number of important disadvantages. They are composed of large, heavy metal parts and, therefore, are uneconomical as regards the space required, the supports required to support their weight, and the large amount of metal which is present in their construction. Any decrease which is possible in the size, weight and amount of metal employed in high pressure valves is quite important because of the resultant saving in space, in supporting means and in cost of metal, and in reduction of temperature differentials and corresponding stresses.

The valve bodies of the present-day high pressure valves are provided with large flanges around some of, or all, the openings, particularly the opening which receives the valve unit and usually at the openings where pipe connections are to be made. The parts which are to be connected to such flanges are likewise flanged. Gaskets are used between two opposed flanges to seal the opening and a large number of good sized bolts spaced short distances apart are relied on to compress the gasket and prevent escape of high pressure fluid between the flanges. Not only is this construction unduly heavy but also it is not safe when in use. Since the pressure area of the valve body opening is much smaller than that of the gasket or sealing area, and since the load varies directly as the square of the diameter of the sealing area, the load which bolts must carry is greater than the actual load on the valve body. It is necessary, therefore, to provide flanges and bolts which will withstand this increased load, and to place the flange bolts as close together as possible, for the load must be carried by the tensile strength of the bolts. If the load is sufficient to stretch the bolts even slightly, the high pressure fluid may escape past the gasket, and if it is sufficiently high to exceed the ultimate strength of the bolts and break them, the entire valve fails and may result in injury to workmen as well as the shutting down of a power plant costing millions of dollars.

Moreover, such a construction does not permit any relative expansive and contractive movement of one valve part relative to another with temperature changes, and since the valve parts are not subjected to equal and simultaneous heating and cooling, considerable variation in the sizes of the two adjacent parts is common. For example, when high temperature fluid is admitted into a flanged valve body, the body will expand at a rate different from that of a flanged connection at the valve unit opening. Such differential expansion can take place in present day valves only by deflection of the weaker of two differently expansible elements or parts. While present-day valve constructions may permit such deflections at lower temperatures, it seems that there is a limit at about 500° F. fluid temperature beyond which either the joints become leaky or the bolts become overstrained or broken when differential expansion occurs.

Other disadvantages will be pointed out hereinafter.

The present invention aims to avoid the many disadvantages and shortcomings of the present-day high pressure valves and, in contrast with such valves, to provide a valve construction which is characterized by being relatively small in size and light weight and containing a small amount of metal; by being safe, reliable and easy to operate in handling fluids under pressures of as much as 2500 pounds per square inch or more, and temperatures of several hundred degrees F.; by requiring a small amount of time for assembly, disassembly, installation, inspection, maintenance and repair; by being free from all, or substantially all, flanges, flange bolts and flange gaskets; by having a small area subjected to internal pressures with the resultant low stresses in the sealing elements; by being capable of differential expansion and contraction in the various parts under varying temperature conditions; by having sealing means whose sealing action varies with the pressure of the fluid to be sealed;

and in general by being simplified and yet adapted to meet the severe conditions to which it is subjected in the control of high pressure high temperature fluids as well as to control fluids of lower temperatures or pressures.

In the drawings accompanying and forming a part of this specification,

Figure 1:
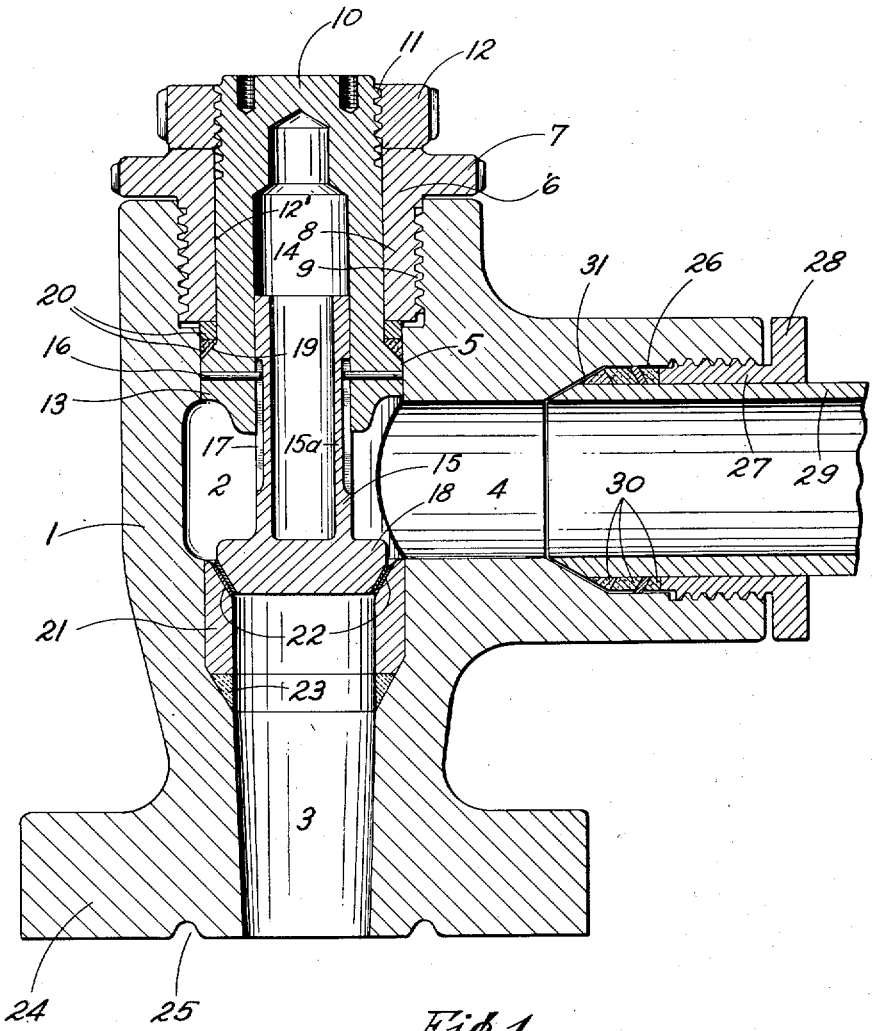
Figure 1 is a central cross-sectional view through a check-valve embodying the present invention.

The checkvalve shown in Fig. 1 comprises a valve body 1 having a fluid chamber 2, a fluid inlet opening 3, a fluid outlet opening 4 and a valve unit receiving opening 5 aligned with opening 3. A ring 6 is located in the outer end of opening 5. It consists of a flange 7 to receive a wrench and a cylindrical part 8 carrying threads 9 to engage with corresponding threads in the opening. Preferably these threads are relatively heavy, strong and loose fitting and one or both sets of threads are plated with non-corrodible metal, such as chromium. The cylindrical dashpot 10 includes an outer end threaded as at 11 to carry locking ring 12, a midportion 12' which slidably engages the inner surface of ring 6 and an inner end enlarged as at 13 to have a sliding fit with the cylindrical surface of opening 5 beyond the inner end of ring 6. The dashpot 10 is cored out axially to form a cylindrical recess 14 in which the stem 15a of the valve 15 may slide. Pins 16 located in the portion 13 of dashpot 10 project into grooves 17 in the valve stem and prevent rotation of the valve stem and its valve head 18.

The outer surfaces of dashpot 10 is beveled as at 19 and between the surfaces 5, 12 and 19 and the adjacent end surface of cylinder 8, packing means 20 are disposed.

The ring 6, dashpot 10, ring 12 and valve 15 and packing 20, comprise a valve unit which is removable from the valve body as a unit by backing off ring 12 to relieve the pressure on packing 20 and then unscrewing ring 6. When fluid under pressure is in chamber 2 it presses part 13 of dashpot 10 axially. This pressure is resisted by ring 6 and its threads 9. The pressure compresses the packing 20 and as the pressure varies the compression of the packing varies. The valve body and valve unit are free to expand and contract independently of each other and such independent action of one of these members does not cause distortion of the other member.

The valve seat 21 is an elongated tube which is disposed in the inlet opening 3 of the valve body, has a seating surface 22 at its inner end and is attached to the body by weld metal 23 at its outer end. The seating surface 22 is disposed at an angle of more than 10 degrees to the axis of the inner opening 3 and the opposed surface of the valve head 18 is correspondingly inclined to that axis. Surface 22 and the cooperating surface of head may be made of stellite or similar wear resisting metal.

When the seating surface 22 is so inclined the stream of fluid flowing thru seat 21 will not follow the surface and hence will not cut it away or form grooves in it as might take place if the angularity of the surfaces was less and the fluid followed the surface. Also the cooperating surface of valve head 18 will be similarly protected because the fluid will flow radially across the end of the head and then past but out of wearing contact with such cooperating surface. Thus the seating surfaces will endure long use because of their angularity to the direction of flow of the fluid.

At the lower end of the valve body 1 of Fig. 1 is shown a flange 24 which may be welded or otherwise secured to a pipe connection, the annular depression 25 in the face of the flange being provided for the purpose of receiving sealing material such for example as a metal ring (not shown).

At its outer end, outlet opening 4 is enlarged radially as at 26 and is screw-threaded. A screw-threaded cylindrical ring 27 provided with a flange 28 encircles a pipe connection 29 which projects into opening 4. When the ring 27 is screwed into the body 1, it compresses packing rings 30 disposed between pipe 29, body 1 and the beveled surface 31, and not only seals the outlet opening but retains the pipe connection 29 in place. If desired, the ring 27 may be welded to the pipe connection 29.

Figures 2, 3:
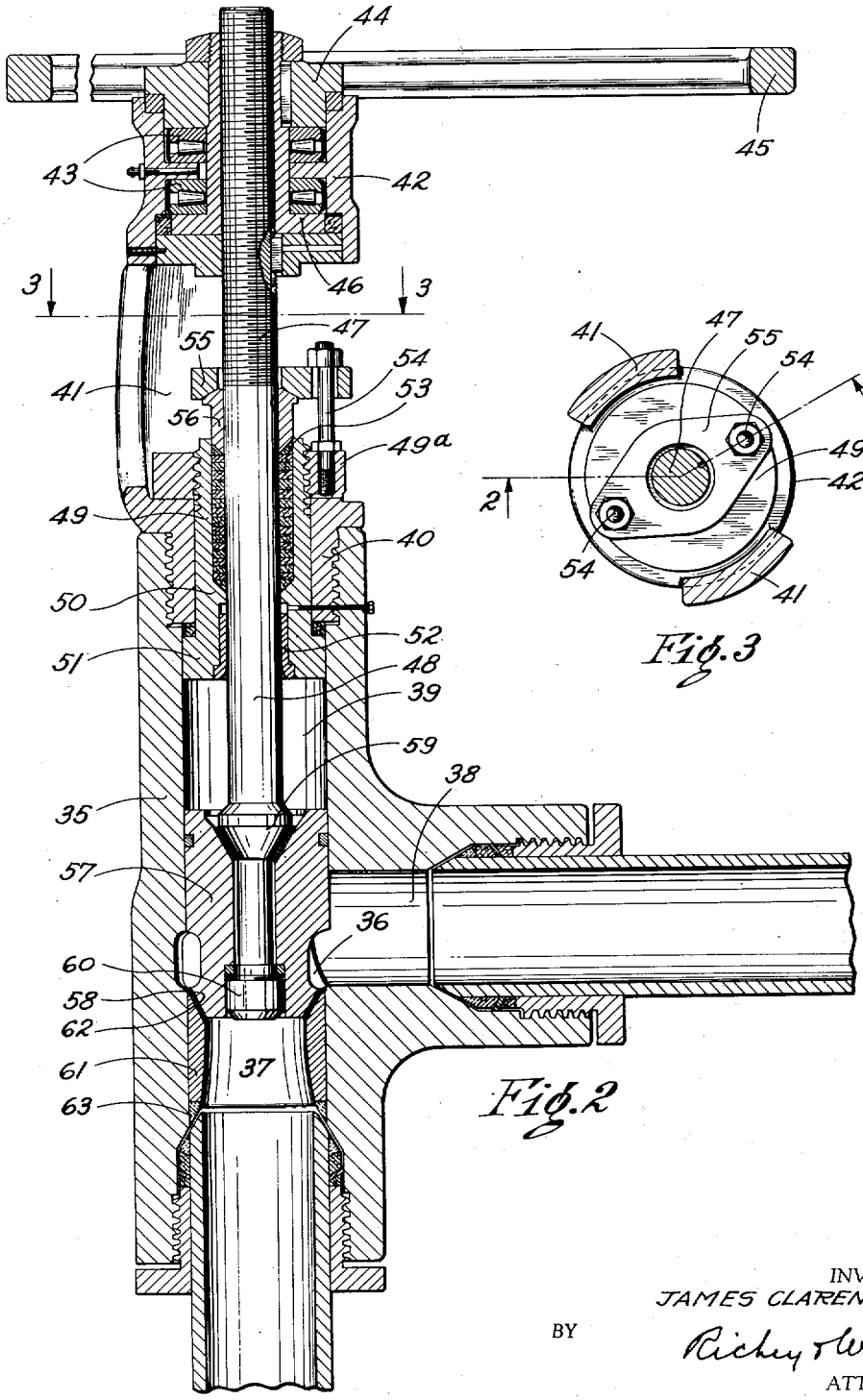
Figure 2 is a sectional view taken on line 2—2 of Fig. 3 and showing a pressure reducing valve embodying the present invention.
Figure 3 is a cross-sectional view taken on line 3—3 of Fig. 2.

The valve shown in Figures 2 and 3 is like the valve of Figure 1 in many respects. The valve body 35 has a chamber 36, an inlet opening 37, an outlet opening 38 and a valve unit receiving opening 39 opposed to opening 37. The pipe connections in openings 37 and 38 are similar and substantially like the pipe connection in opening 4 of Figure 1, and will not be redescribed here.

The valve unit of Figs. 2 and 3 comprises several parts, some of which are similar to the valve unit of Figure 1. This unit includes a bonnet comprising a ring 40 having screw threaded engagement in the outer end of opening 39, and two legs 41 attached to a housing 42. Thrust bearings 43 are disposed in the housing between the hub 44 of a hand wheel 45 and a flanged sleeve 46, which is keyed to hub 44 and interiorly threaded on the stem 47 of valve 48. When the hand wheel 45 is rotated the sleeve 46 rotates and moves the valve 48 axially.

The valve unit also includes a cylindrical guide 49 having threads at its outer end to receive ring 49a, a mid-portion 50 having sliding engagement on the inner surface of ring 40 and an enlarged inner end 51 having sliding engagement with the wall of opening 39. The guide 49 carries a wear bushing 52 in an axial opening at its inner end, and carries a plurality of packing rings 53 in an axial opening at its outer end.

The ring 49a carries two studs 54 and a gland follower 55 having a central opening through which the stem of valve 48 may pass. The lower surface of plate 55 is concave adjacent to this opening, and bears against the convex end of a packing gland 56 which presses against packing rings 53.

The valve unit also includes a valve head 57 at the inner end of valve stem 48 which head has sliding engagement in the opening 39 and a seating surface 58. This head 57 has an axial opening to receive the valve stem and is held in place on the stem between shoulder 59 and nut 60. In the opening 37 is disposed an elongated, tubular valve seat 61 having a seating surface 62 at one end. This seat 61 may be welded at its outer end to valve body 35 by weld metal as indicated at 63 or it may be slightly tapered on its outer surface, pushed into place through the outer end of inlet 37 and held in place by the inner end of the adjacent pipe connection.

The cooperating seating surfaces 56 and 62 are preferably inclined at angles of 10 degrees or more to the axis of inlet opening 37 as has previously been described in connection with the seating surfaces of Figure 1, and for similar purposes.

Figure 4:
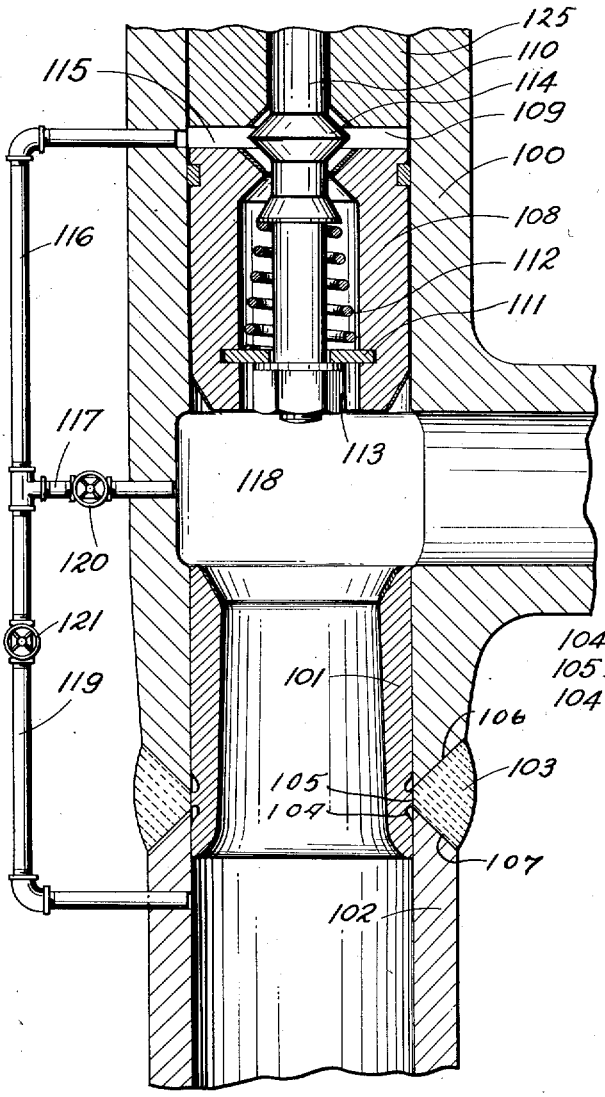
Figure 4 is a fragmentary view of a modified form of valve embodying the present invention and including a bypass construction; and, Figure 5 is a fragmentary enlarged, sectional view showing one means embodying the present invention for attaching a valve seat in a valve body.
Figure 5:
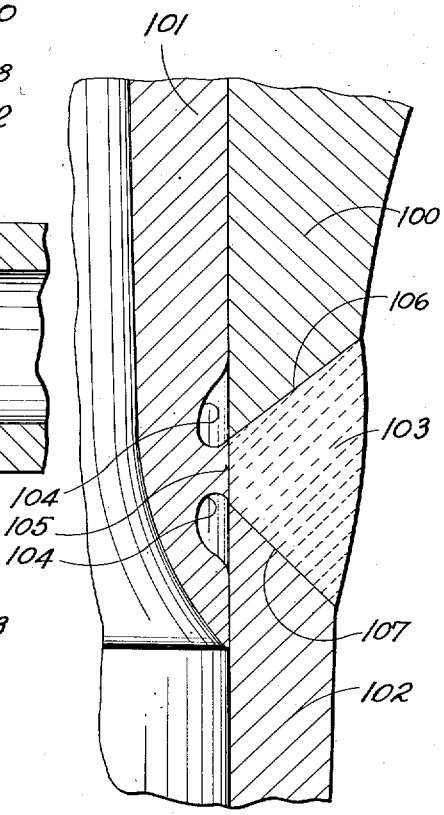

In Figures 4 and 5 the valve body 100 is connected to an elongated valve seat 101 and to a pipe connection 102 by weld metal 103. This manner of connecting valve seat, body and pipe connection is quite desirable because it prevents weld metal from getting into the interior of the valve or connections, and also prevents breakage due to differential expansion and contraction of these parts. Preferably the valve seat 101 is recessed as at 104 to leave a land 105 of substantially the size of the space between the bevelled edges 106 and 107 of the body and pipe connection respectively. The weld metal units these two bevelled surfaces and also the land 105.

Figure 4 shows a bypass device for utilizing the fluid to assist in opening or closing the valve. The valve head 108 has a cylindrical outer surface engaging the surface of the valve receiving opening 109, and it has an axial opening in which is disposed a valve stem 110, a spring retaining washer 111, a spring 112, and a nut 113. The shoulder 114 is adapted to seal such axial opening when spring 112 is compressed.

The space 115 in the valve body between the outer end of head 108 and guide 125, which corresponds to guide 49 of Fig. 2 is connected through piping 116 and 117 to the chamber 118 of the valve body and through piping 116 and 119 to inlet pipe connection 102. Valves 120 and 121 serve to control piping 117 and 119 respectively.

Suitable manipulation of the valves 120 and 121 makes it easy to actuate the valve when high fluid pressures are involved and regardless of whether the pressures are applied against the side or end of the valve head. When the valve head 108 is to be moved from the open position, as shown in Fig. 4, to closed position on seat 101, and fluid under pressure is entering the valve body through the side connection, valve 120 is opened and valve 121 is closed. Fluid under pressure then flows through pipe 116 into the space 115 at the outer end of valve head 108 and exerts a force on the valve head tending to move it to seating position because the area of the outer end of the valve head 108 is larger than the area across the seat 101. When the valve head is to be moved to open position, valve 120 is closed and valve 121 is opened, thus relieving the fluid pressure at the outer end of valve head 108 and permitting retracting movement of the head without the resistance of fluid pressure thereagainst.

If the fluid pressure is upward through pipe connection 102 in Fig. 4 and it is desired to close the valve, valve 121 is opened, thereby permitting fluid pressure to flow into the space 115 at the outer end of the valve head 108 where it will tend to move the valve head into seated position. If it is desired to open the valve, valve 121 is closed, valve 120 is opened and valve stem 110 is retracted, thereby permitting fluid pressure to pass through valve head 108 and to bleed into chamber 118 and thereby decreasing the upward thrust on the valve actuating mechanism.

It will be understood that the bypass apparatus just described may be embodied in the valve of Figure 2 if desired.

It will be understood from the accompanying drawings and the foregoing description that the present invention possesses many new and novel features and advantages. Valves embodying this invention are relatively quite small as compared with prior valves, even those devised for much lower pressures and hence require much less space than the prior valves. Furthermore, the present valves contain much less metal and are, therefore, lighter in weight and cheaper in metal cost than prior valves and require cheaper or lighter supports. Moreover, the wall thickness of the present valves is sufficiently thick to withstand the pressures involved, and where changes in thickness occur the change is made gradually so as not to result in a weakened structure or in use of undue amount of metal to overcome any weakness due to an abrupt change in thickness.

The valves of the present invention combine safety, reliability and ease of operation in handling pressures as high as twenty-five hundred (2500) pounds per square inch or more and having temperatures of several hundred degrees Fahrenheit, for they are strong enough to resist breakage in use, they employ novel packing means which insure reliability in sealing such fluids, the actuation of the valves is not hampered by distortion of the parts and the fluid pressure may be employed to assist in actuation of the valves.

The valves of this invention may be assembled, disassembled, installed, inspected, maintained and repaired readily and quickly largely because of the new and novel construction and arrangement of valve parts. A plurality of valve parts are combined in a unit which may be assembled with or disassembled from the valve body in a very short period of time. The new and novel manner of sealing the valve and valve unit is not only highly efficient but is removable as a part of the valve unit.

Another highly important feature of the present invention is that the valves may be entirely free from all flanges, flange bolt and flange gaskets and the areas which must be sealed and which are subjected to internal pressures are much smaller in contrast to those in prior valves with the result that the sealing of such areas is simplified and improved. In addition, the present invention provides sealing and packing which is compressed by the fluid pressure and the sealing effect of such packing is increased as the pressure to be sealed increases.

Another important feature of the present invention is that it provides for differential expansion and contraction of parts of the valve which are subjected to heating and cooling at different rates. Since the parts can expand and contract independently of each other many stresses of the prior valves are thereby avoided.

Having thus described my invention so that others skilled in the art may be able to practice the same, I state that what I desire to secure by Letters Patent is defined in what is claimed.

What is claimed is:

1. A valve for high pressure fluid comprising a metal body having *a valve seat and* a valve-receiving opening, outer and inner members in said opening having telescoped annular portions and axially opposed surfaces, *said outer member being fixed to said body against axial movement,* annular packing means between said opposed surfaces and [engaging] *engageable with* the wall of said opening, *force applying means including a member attached to said inner member to move the latter outward axially relative to the outer member and thereby to press the packing means against said opposed surfaces and the wall of the opening with initial sealing pressure,* said outer and inner members and packing being non-rotatable relative to each other *during the creation of said initial sealing pressure,* [and] a valve [carrying] *engageable with said seat with fluid sealing contact and a* stem [freely] slidable axially in said inner member, *and operatively associated with said valve.*

2. A valve for high pressure fluid comprising a metal body having *a valve seat and* a valve-receiving opening, outer and inner members in said opening having telescoped annular portions and axially opposed surfaces, *said outer member having screw-threaded connection to said body,* annular packing between said opposed surfaces and engaging the wall of said opening, means *engaging said members* for moving *the inner member outward axially relative to the outer member* [said outer and inner members axially relative to each other] to compress said packing between said axially opposed surfaces and against said walls of the opening[,] *with initial fluid sealing pressure,* said outer and inner members and packing being non-rotatable relative to each other[,] *during the creation of said initial pressure,* [and] a valve *engageable with said seat with fluid sealing contact,* [carrying stem freely] *and a stem attached to said valve and* slidable axially in said inner member.

3. A valve for high pressure fluid comprising a metal body having a valve-receiving opening, outer and inner telescoped annular members in said opening having axially opposed surfaces, *the outer member lying between the inner member and the body,* annular packing between said opposed surfaces and engaging the wall of said opening, said outer and inner members and packing being non-rotatable relative to each other, a valve carrying stem extending axially thru said inner member, and means carried by said outer member for actuating said valve stem.

4. A valve for high pressure fluid comprising a metal body having a valve-receiving opening, outer and inner telescoped annular members in said opening having axially opposed surfaces, annular packing between said opposed surfaces and engaging the wall of said opening, said outer and inner members and packing being non-rotatable relative to each other, a valve carrying stem extending axially thru said inner member, packing around said stem in said inner member, and means carried by said outer member for actuating said valve stem.

5. A valve for high pressure fluid comprising a metal body having a valve-receiving opening, outer and inner telescoped annular members in said opening having axially opposed surfaces, annular packing between said opposed surfaces and engaging the wall of said opening, said outer and inner members and packing being non-rotatable relative to each other, a valve carrying stem extending axially thru said inner member, a bonnet secured to said outer member, and means carried by said bonnet for moving said stem axially and non-rotatably in said inner member.

6. A valve for high pressure fluid comprising a metal body having a valve-receiving opening, outer and inner telescoped annular members in said opening having axially opposed surfaces, annular packing between said opposed surfaces and engaging the wall of said opening, a ring screw-threaded on the outer end of said inner member and bearing on the outer end of said outer member for moving the inner member relative to the outer member, said outer and inner members and packing being non-rotatable relative to each other, a valve carrying stem extending axially thru said inner member, packing around said stem in said inner member, a bonnet secured to said outer member, and means carried by said bonnet for moving said stem axially and non-rotatably in said inner member.

7. A valve for high pressure fluid comprising a metal body having a valve-receiving opening, an abutment ring screw-threaded in said opening, a flanged hollow guiding and clamping member extending thru said abutment ring *and having a surface inclined to the opposed wall of the opening,* annular packing surrounding said hollow member and abutting against [the flange thereof] *said surface* and against said ring, means screw-threaded on said guiding member and seating on said ring for clamping said packing against said ring, *surface* and the adjacent wall of said opening [and for preventing] *while avoiding* relative rotation of said ring, packing and guiding member, and a valve carrying stem slidable [freely] in said guiding member.

8. A valve for high pressure fluid comprising a metal body having a valve-receiving opening, an abutment ring screw-threaded in said opening, a flanged hollow guiding and clamping member extending thru said abutment ring *and having a surface defining a tapered annular space with the wall of the opening,* annular packing surrounding said member, *extending into said tapered space* and abutting against [the flange thereof] *said surface* and against said ring, means screw-threaded on said guiding member and seating on said ring for clamping said packing *in said space* against said ring, *flanged member* and the adjacent wall of said opening [and for preventing] *while avoiding* relative rotation of said ring, packing and guiding member, a valve carrying stem slidable [freely] in said guiding member, and means for preventing relative rotation of said stem and guiding member.

9. A valve for high pressure fluid comprising a metal body having a valve-receiving opening, an abutment ring screw-threaded in said opening, a flanged hollow guiding and clamping member extending thru said abutment ring *and defining with the walls of said opening an inwardly tapering annular recess,* annular packing *having inner and outer sides convering toward its inner edge* surrounding said hollow member and abutting against the flange thereof and against said ring *and projecting into said tapering space,* means screw-threaded on said guiding member and seating on said ring for clamping said packing against said ring and the adjacent wall of said opening *in said tapering space* [and for preventing] *while avoiding* relative rotation of said ring, packing and guiding member, a valve carrying stem slidable [freely] in said guiding member, and means outside of said body for moving said stem axially in said guiding member.

10. A valve for high pressure fluid comprising a metal body having a valve-receiving opening, an outer annular abutment member screw-threaded in said opening, an inner member adjustably slidably mounted in said outer member and having an axial recess and an outwardly projecting flange at its inner end, *the flange having a surface making an acute angle with the adjacent wall of said opening*, annular packing between said flange and abutment member and engaging the wall of said opening *and said surface*, ring means engaging said outer member and said inner member for adjusting them relative to each other and to said packing [and for preventing] *and creating initial sealing contact of the packing, body and inner member while avoiding* relative rotation of said members and packing, and a valve carrying stem slidable in the recess in said inner member.

11. A valve for high pressure fluid comprising a metal body having a valve-receiving opening, outer and inner members in said opening having telescoped annular portions and axially opposed surfaces, *the outer member lying between the inner member and the body*, annular packing means between said opposed surfaces and engaging the wall of said opening, said outer and inner members and packing being non-rotatable relative to each other, a valve stem [freely] slidable axially in said inner member, a valve on said stem, the said body having fluid inlet and outlet openings, a valve seat in one of said openings, and a by-pass connecting the spaces in said metal body on opposite sides of said valve seat and at the outer end of said valve.

12. A valve for high pressure fluid comprising a metal body having a valve-receiving opening, outer and inner members in said opening having telescoped annular portions and axially opposed surfaces, *said outer member being fixed to said body against axial movement*, annular packing means between said opposed surfaces and engaging the wall of said opening, said packing being exposed on one side to fluid pressure within said body and being compressible thereby against the [outer one of said] axially opposed [surfaces] *surface on said inner member* and the wall of said opening, *means including a member attached to the inner member for moving it outward axially in the outer member and thereby applying initial sealing pressure of the packing means on said opposed surfaces and the wall of the opening*, said outer and inner members, and packing being non-rotatable relative to each other[,] *during the creation of said initial sealing pressure*, a valve stem [freely] slidable axially in said inner member, a valve on said valve stem and a valve seat for said valve in said metal body.

*13. A valve for high pressure fluid comprising a metal body having a valve seat and a valve-receiving opening, outer and inner members in said opening having telescoped annular portions and axially opposed surfaces, said outer member being fixed to said body against axial movement, annular packing means between said opposed surfaces and engageable with the wall of said opening, said packing means having side surfaces converging toward its inner end between said body and inner member, force applying means including a member attached to said inner member to move the latter outward axially relative to the outer member and thereby to press the packing means against said opposed surfaces and the wall of the opening with initial sealing pressure, said outer and inner members and packing being non-rotatable relative to each other during the creation of said initial sealing pressure and a valve engageable with said seat with fluid sealing contact and having a stem slidable axially in said inner member.*

*14. A valve for high pressure fluid comprising a metal body having a valve seat and a valve-receiving opening, outer and inner members in said opening having telescoped annular portions and axially opposed surfaces, the said surface of the inner member and the adjacent wall of said opening defining an inwardly tapering annular space, said outer member being fixed to said body against axial movement, annular packing means between said opposed surfaces, projecting into said tapering space and engageable with the wall of said opening, force applying means including a member attached to said inner member to move the latter outward axially relative to the outer member and thereby to press the packing means against the walls defining said tapering annular space with initial sealing pressure, said outer and inner members and packing being non-rotatable relative to each other during the creation of said initial sealing pressure, a valve stem extending slidably and axially thru said inner member, a valve on said stem engageable with said seat with fluid sealing contact, and means supported by said body for moving said valve stem to seat and unseat said valve.*

*15. A valve for high pressure fluid comprising a metal body having a valve-receiving opening, outer and inner telescoped annular members in said opening having axially opposed surfaces, the said surface of the inner member and the adjacent wall of said opening defining an inwardly tapering annular space, said outer member being fixed to said body against axial movement, annular packing between said opposed surfaces, projecting into said tapering space and engaging the wall of said opening, means including a member attached to the outer end of said inner member for moving the inner member outwardly relative to the outer member and thereby creating initial sealing pressure of the packing means on the walls defining said tapering annular space, said outer and inner members and packing being non-rotatable relative to each other during creation of said initial sealing pressure, a valve carrying stem extending axially thru said inner member, packing around said stem in said inner member, a bonnet supported by said body, and means carried by said bonnet for moving said stem axially in said inner member.*

*16. A valve for high pressure fluid comprising a metal body having a valve seat and a valve-receiving opening, an outer annular abutment member screw-threaded in said opening, an inner member adjustably slidably mounted in said outer member and having a closed outer end, an axial recess in its inner end, and an outwardly projecting flange at its inner end, annular packing between said flange and abutment member and engaging the wall of said opening, ring means engaging said outer member and connected to said inner member for adjusting the inner member outwardly relative to the outer member and to said packing while avoiding relative rotation of said members and packing, a valve stem slidable in the recess in said inner member, and a valve on said stem engageable with said seat.*

*17. A valve for high pressure fluid comprising a metal body having a valve seat and a valve-receiving opening, an abutment ring fixed to the body in said opening against axial movement, a flanged hollow guiding and clamping member extending thru said abutment ring and defining a* tapered annular space with the wall of the opening, annular packing surrounding said hollow member in said space and abutting against the flange thereof and against said ring, means connected to said guiding member and seating on said ring for moving the guiding member outward axially and thereby clamping said packing in said space, against said ring and the adjacent wall of said opening with initial fluid sealing pressure while avoiding relative rotation of said ring, packing and guiding member, a valve in said opening, a valve stem slidable in said guiding member, and means outside of said body for moving said stem axially in said guiding member and bringing said valve into and out of seating engagement with said valve seat.

18. A valve for high pressure fluid comprising a metal body having a valve-receiving opening and a chamber having inlet and outlet openings, an outer annular member having an annular surface at its inner end, an inner member extending through said outer member and having an annular surface opposed to the said end surface of the outer member, annular packing means between said opposed surfaces and engaging the wall of said opening, said outer and inner members and packing being non-rotatable relative to each other, a valve stem slidable axially in said inner member, a valve seat in said chamber between the inlet and outlet openings, a valve in the valve-receiving opening operatively associated with said stem, and a conduit by-passing said valve and connecting the space in the valve-receiving opening at the outer end of the valve with the said chamber on the outlet side of said seat.

19. A valve comprising a metal body having a valve seat and a valve-receiving opening, outer and inner members in said opening having telescoped portions, the outer member lying between the inner member and the body, said outer and inner members having opposed annular surfaces facing inwardly and outwardly respectively, annular packing means between and engaging said opposed surfaces and engaging the wall of said opening, said outer and inner members and packing being non-rotatable relative to each other, and a valve movable axially in said opening and engageable with said seat.

20. A valve comprising a metal body having a valve seat and a valve-receiving opening, outer and inner members in said opening having telescoped portions, said outer and inner members having opposed annular surfaces facing inwardly and outwardly respectively, the outer member lying between the inner member and the body, annular packing means between and engaging said opposed surfaces and engaging the wall of said opening, the packing and the inner end of said inner member being exposed to fluid pressure within said body, the projected area of the said exposed inner end being greater than the projected area of the packing, said outer and inner members and packing being non-rotatable relative to each other, and a valve movable axially in said opening and engageable with said seat and means connected to said body for actuating said valve.

21. A valve for high pressure fluid comprising a metal body having a chamber having inlet and outlet openings and a valve-receiving opening, outer and inner members in said opening having telescoped portions, said outer and inner members having opposed annular surfaces facing inwardly and outwardly respectively, the outer member lying between the inner member and the body, annular packing means between and engaging said opposed surfaces and engaging the wall of said opening, said outer and inner members and packing being non-rotatable relative to each other, a valve seat in said chamber between said inlet and outlet openings, a valve movably axially in said opening and engageable with said seat, and a conduit by-passing said valve and connecting the space in the valve-receiving opening at the outer end of the valve with said chamber on one side of said seat.

22. A valve comprising a metal body having a valve-receiving opening, outer and inner members in said openings having telescoped portions and axially opposed annular surfaces, said outer member being fixable to said body against axial movement, annular packing means between said opposed surfaces and engaging the wall of said opening, said packing being exposed on one side to fluid pressure within said body and being compressible against the axially opposed surface on said inner member and the wall of said opening, means connected to one of said members for moving it axially relative to the other member and thereby applying initial sealing pressure of the packing means on said annular surface of the inner member and on the wall of the opening, said outer and inner members, and packing being non-rotatable relative to each other during the creation of said initial sealing pressure, a valve seat in said body and a valve movable in said opening and engageable with said seat.

23. A valve comprising a metal body having a valve-receiving opening, outer and inner members in said openings having telescoped annular portions and axially opposed surfaces, said outer and inner members having opposed annular surfaces facing inwardly and outwardly respectively, said outer member being fixable to said body against axial movement, annular packing means between said opposed surfaces and engaging the wall of said opening, said packing being exposed on one side to fluid pressure within said body and being compressible against the axially opposed surface on said inner member and the wall of said opening, means connected to one of said members for moving it axially relative to the other member and thereby applying initial sealing pressure of the packing means on said annular surface of the inner member and on the wall of the opening, said outer and inner members, and packing being non-rotatable relative to each other during the creation of said initial sealing pressure, a valve seat in said body, a valve movable in said opening and engageable with said seat and means connected to said body for actuating said valve.

JAMES CLARENCE HOBBS.

REFERENCES CITED

The following references are of record in the file of this patent or the original patent:

UNITED STATES PATENTS

| Number | Name | Date |
|---|---|---|
| 1,229,245 | Eddy | June 12, 1917 |
| 1,496,391 | Thomas | June 3, 1924 |
| 1,678,946 | Joyce | July 31, 1928 |
| 1,689,799 | Nordstrom | Oct. 30, 1928 |
| 1,870,293 | Miller | Aug. 9, 1932 |
| 2,029,606 | Bredtschneider | Feb. 4, 1936 |
| 2,069,297 | Abercrombie | Feb. 2, 1937 |
| 2,095,395 | Mueller | Oct. 12, 1937 |